US005502110A

United States Patent [19]

Matsumoto et al.

[11] Patent Number: 5,502,110

[45] Date of Patent: Mar. 26, 1996

[54] RESIN COMPOSITION FOR ELECTROPHOTOGRAPHIC TONER

[75] Inventors: Katsuru Matsumoto, Kanagawa; Nobuhiro Hirayama, Hiratsuka; Kenji Uchiyama, Odawara; Shoji Kawasaki, Yokohama; Tamami Fukui, Yokohama; Katsuo Uramoto, Yokohama, all of Japan

[73] Assignee: Mitsui Toatsu Chemicals, Incorporated, Tokyo, Japan

[21] Appl. No.: 52,831

[22] Filed: Apr. 27, 1993

[30] Foreign Application Priority Data

| | | | |
|---|---|---|---|
| Apr. 28, 1992 | [JP] | Japan | 4-110338 |
| Jun. 11, 1992 | [JP] | Japan | 4-152176 |
| Jun. 15, 1992 | [JP] | Japan | 4-154848 |
| Jun. 25, 1992 | [JP] | Japan | 4-167351 |
| Sep. 4, 1992 | [JP] | Japan | 4-237295 |

[51] Int. Cl.[6] .......................... C08L 33/04; C08L 33/24; C08L 25/04; C08L 25/14

[52] U.S. Cl. .......................... 525/221; 525/214; 525/217; 525/218; 525/223; 525/205; 525/207; 525/225; 525/226; 525/227; 525/228

[58] Field of Search .......................... 525/227, 228, 525/226, 241, 221; 526/232.3, 232.5

[56] References Cited

U.S. PATENT DOCUMENTS

| | | | |
|---|---|---|---|
| 3,933,665 | 1/1976 | Van Engeland et al. | 525/228 |
| 3,992,486 | 11/1976 | Lang | 525/226 |
| 4,165,308 | 8/1979 | Serlin | 525/228 |
| 4,990,424 | 2/1991 | Van Dusen et al. | 525/241 |
| 5,166,026 | 11/1992 | Fuller et al. | 525/241 |
| 5,185,405 | 2/1993 | Nishida | 525/228 |
| 5,254,650 | 10/1993 | Fukumura | 526/232.3 |

FOREIGN PATENT DOCUMENTS

| | | |
|---|---|---|
| 0354466 | 2/1990 | European Pat. Off. . |
| 0460243 | 12/1991 | European Pat. Off. . |
| 0463840 | 1/1992 | European Pat. Off. . |
| 2232160 | 12/1990 | United Kingdom . |

*Primary Examiner*—Carman J. Seccuro, Jr.
*Attorney, Agent, or Firm*—Oblon, Spivak, McClelland, Maier & Neustadt

[57] ABSTRACT

A resin composition for an electrophotographic toner is here disclosed which comprises an ethylene series high polymer (Y) and an ethylene series polymer (X) prepared from 100 parts of a bifunctional ethylene series unsaturated monomer and 0.01–10 parts by weight of a substance having three or more peroxide groups in the molecule and/or a substance having one or more unsaturated functional groups and one or more peroxide groups in the molecule, Mw/Mb (Mw is weight-average molecular weight, and Mb is weight-average molecular weight between crosslinking points) of said polymer (X) being from 2 to 99, Mw of said polymer (X) being 50,000 or less. This resin composition is excellent in the balance of various physical properties required for the toner, and particularly, it is excellent in offset resistance and toner strength.

9 Claims, No Drawings

RESIN COMPOSITION FOR ELECTROPHOTOGRAPHIC TONER

BACKGROUND OF THE INVENTION (i) Field of the Invention

The present invention relates to a resin composition for an electrophotographic toner for developing electrostatic charge images in electrophotography, electrostatic recording and electrostatic printing. More specifically, it relates to a resin composition for an electrophotographic toner which can be applied to high-speed machines and which has good balance of fixing/offset properties and excellent durability.

(ii) Description of the Prior Art

In general, an electrophotography for use in a duplicator or a printer is a technique (a heat roll fixing system) which comprises forming an electrostatic latent image on a photosensitive member, developing this latent image by the use of a toner, transferring the toner image onto a sheet to be fixed such as a paper, and then heating/pressing the image with a heat roll. In this technique, the fixing is done under heating and pressing, and so the prompt fixing is possible and a thermal efficiency is extremely high, with the result that a fixing efficiency is very high. However, if this fixing system is utilized with a conventional toner, the toner adheres to and transfers to the surface of the heat roll in a step in which the surface of the heat roll comes in contact with the toner in a melting state. In consequence, the adhered toner further transfers to the next sheet to be fixed, so that the sheet is unpreferably contaminated therewith (an offset phenomenon).

On the other hand, the duplicators have a tendency toward speed-up, and thus a contact time of the fixing roll with the toner is naturally shortened. Therefore, the toner which can be melted by heating for a short period of time is desired. Furthermore, the toner is required which can melt at the lowest possible temperature from the viewpoint of energy saving or safety and which is excellent in fluidity, when melted. In order to obtain the toner having the excellent fluidity, a means for decreasing the molecular weight of a binding resin can be contrived, but such a means is not preferable, because the decrease in the molecular weight makes the cohesion force of the binding resin poor, so that the offset phenomenon is unpreferably liable to occur. If it is attempted to reduce the particle diameter of the toner for the purpose of achieving a high resolving power, a fine powder which is not useful as the toner increases at the time of fine grinding in a toner preparation step, which deteriorates the yield of toner preparation.

Japanese Patent Application Laid-open No. 101031/1974 discloses a technique for obtaining a toner composition which can widen a fixing temperature range by using a crosslinked polymer as the binding resin and which does not give rise to any offset phenomenon even at a relatively high fixing temperature. Furthermore, in Japanese Patent Application Laid-open No. 6895/1980, there is disclosed a technique for obtaining a toner composition with good offset resistance which comprises using, as a binding resin, a polymer meeting the requirements of weight-average molecular weight (hereinafter referred to as "Mw")/number-average molecular weight (hereinafter referred to as "Mn")=3.5–40 and Mn=2,000–30,000. However, the toners obtained by these techniques can scarcely be used in high-speed duplicators and small duplicators in which the amount of heat from the heat fixing roll is not sufficiently transmitted.

That is, if the polymer having the large Mw or the crossliked polymer is used so as to prevent the offset phenomenon, the viscosity of the binding resin increases to deteriorate fixing properties. Conversely, if the polymer having the small Mw or the non-crossliked polymer is used so as to lower the viscosity of the binding resin, an image thermally fixed on a paper is broken by folding or rubbing the paper, so that the toner adhering onto the paper falls down and a defect appears in the image, or image quality is impaired by the offset phenomenon.

As another solvable means, Japanese Patent Application Laid-open No. 75033/1973 discloses an excellent toner using a block copolymer which comprises a hard resin block [a polymer portion having a high glass transition temperature (hereinafter referred to as "Tg")] and a soft resin block (a polymer portion having low Tg). However, when this toner using such a block copolymer is used in the duplicator having the heat roll fixing system, the offset phenomenon takes place and it is noticeably difficult to grind the toner in a kneading/grinding method which is a usual preparation method presently employed, so that productivity extremely deteriorates unpreferably.

Additionally, in Japanese Patent Application Laid-open Nos. 88071/1980, 88073/1980 and 90958/1980, some techniques for obtaining a magnetic toner having the excellent offset resistance and fixing properties are disclosed which comprise melting and kneading (1) a styrene polymer, (2) a polystyrene-polybutadiene-polystyrene ABA type block copolymer, (3) a release agent (e.g., polybutene, polybutadiene, a chlorinated paraffin, polyethylene, polypropylene or the like), (4) a magnetic powder and carbon black, and (5) a charging regulator, grinding the kneaded material, and then classifying the resultant particles. In these techniques, however, it is difficult to uniformly disperse the ABA type block copolymer, the release agent, the charging regulator and the like in the styrene polymer in the short-time melting/kneading step, and it has been confirmed that this poor dispersion gives rise to filming and the like, whereby the photosensitive member is easily contaminated. Moreover, if the polystyrene-polybutadienepolystyrene ABA type block copolymer is used in large quantities, a usual grinding by a jet mill or the like cannot be achieved after the kneading, and thus freezing or cold grinding is required.

In order to improve the fixing properties, a technique for obtaining a toner having the heighten offset resistance is disclosed in Japanese Patent Application Laid-open No. 67302/1990 in which a branched polymer is formed in accordance with a suspension polymerization method by the use of a polyfunctional initiator on the basis of the notion that a star-shaped branched polystyrene is more excellent in melting fluidity than a straight-chain polystyrene having the same molecular weight, and the thus formed branched polymer is then used as a high-molecular weight component. Furthermore, Japanese Patent Application Laid-open No. 48657/1990 discloses a technique which comprises forming a high-molecular weight polymer in accordance with a suspension polymerization method by the use of a polyfunctional initiator, forming a low-molecular weight polymer in the presence of the above high-molecular weight polymer, and then using a mixture of these low-molecular weight and high-molecular weight polymers to prepare a toner having the heightened offset resistance.

In Japanese Patent Application Laid-open No. 48675/1990, a technique is disclosed in which a low-molecular weight polymer obtained by a solution polymerization method is dissolved in a polymerizable monomer for a high-molecular weight polymer, and polymerization is then carried out using a polyfunctional (tri- or more-functional) initiator to form a resin for a toner.

As described above, the various techniques have been disclosed, but in the case of the suspension polymerization method, the high-molecular weight resin can be relatively easily obtained by using a crosslinking agent such as divinylbenzene, diethylene glycol dimethacrylate or trimethylol propane dimethacrylate in the polymer preparation step, but in this case, it is necessary to simultaneously use a dispersant and a dispersing agent. Since the dispersant is hygroscopic and have a bad influence on electrical properties, particularly charging stability, they are required to be removed as much as possible after the preparation of the polymer. However, in order to remove the dispersant and the dispersing agent from the polymer by washing or the like, a large amount of washing water is necessary, and after the washing, drainage is also troublesome. These techniques which intend to improve the strength of the toner and the offset resistance are very effective in a conventional duplicator having the problem of the offset phenomenon, but in a low-thermal fixing duplicator, the sufficient low-temperature fixing properties and the satisfactory offset resistance cannot be obtained. This can be presumed to be due to the fact that the toner resin becomes highly viscous because of using the high-molecular weight polymer having large Mw, and the melting fluidity of the toner deteriorates, which is improper to the low-heat quantity duplicator.

If the polymer having small Mw is used, the melting fluidity can be improved, but the offset resistance or the toner strength is poor, so that the toner tends to break or crack during a long-term use to impair image quality.

The present inventors have attempted to improve the strength of a resin by using 0.1 to 4.0 parts by weight of divinylbenzene and an ethylene series polymer having Z average molecular weight (hereinafter referred to as "Mz")/Mn=6 or more and Mw=50,000 or less, as disclosed in Japanese Patent Application Laid-open No. 501873/1991, but in spite of the small amount of divinylbenzene to be used, Mw/Mb becomes large, that is, side chains do not extend sufficiently owing to many crosslinking points, and an entanglement density of molecular chains is also low. Thus, the above-mentioned resin is not so different from a conventional ethylene series polymer.

In addition, the present inventors have developed a resin for the electrophotography toner which is excellent in electrical properties, particularly charging stability by a solution polymerization method, as in U.S. Pat. No. 4,963,456. According to the solution polymerization method, low-volatile components such as an unreacted polymerizable monomer and decomposed materials of an initiator can be all distilled off, when a solvent is removed after the polymerization, and therefore the electrically stable and uniform resin containing very small amounts of impurities can be obtained. This kind of resin is optimum as a resin composition for the electrophotographic toner. However, in the solution polymerization method, a Weissenberg effect (which is the phenomenon that a resin is wound round a stirring rod) tends to appear, and there has been the problem that it is difficult to prepare a high-molecular weight-resin. The present inventors have developed a method for obtaining a resin having higher molecular weight by using a mass polymerization process together with the solution polymerization method, as in U.S. Pat. No. 5,084,368. However, even in the thus prepared high-molecular weight resin, the offset resistance cannot be attained up to a complete level.

SUMMARY OF THE INVENTION

The present invention is directed to a resin composition for an electrophotographic toner which is suitable for high-speed and low-heat quantity fixing duplicators and which can be fixed in a small heat quantity and which has excellent strength.

In order to solve the above-mentioned problems, the present inventors have investigated polymers prepared from a bifunctional ethylene series unsaturated monomer and a substance having three or more peroxide groups in the molecule and/or a substance having one or more unsaturated functional groups and one or more peroxide groups in the molecule, and compounds which can be used together with these polymers. As a result, we have found a resin composition for the toner which is excellent in fixing properties, offset resistance and toner strength (grinding properties), and the present invention has now been completed.

That is, the present invention is connected to a resincomposition for an electrophotographic toner comprising an ethylene series high polymer (Y) and an ethylene series polymer (X) prepared from 100 parts of a bifunctional ethylene series unsaturated monomer and 0.01–10 parts by weight of a substance having three or more peroxide groups in the molecule and/or a substance having one or more unsaturated functional groups and one or more peroxide groups in the molecule, Mw/Mb (Mw is weight-average molecular weight, and Mb is weight-average molecular weight between crosslinking points) of the polymer (X) being from 2 to 99, Mw of the polymer (X) being 50,000 or less.

DETAILED DESCRIPTION OF THE INVENTION

The weight-average molecular weight between crosslinking points (hereinafter referred to as "Mb") of an ethylene series polymer (X) which can be used in the present invention can be approximately represented by the formula (1) containing a branch parameter (λ):

$$Mb=1/\lambda \quad (1)$$

Furthermore, the branch parameter (λ) can be represented by the formula (2) containing a branch point density ($\rho_B$) in the main chain and a molecular weight ($M_0$) of a bifunctional monomer:

$$\lambda=\rho_B/M_0 \quad (2)$$

Here, the branch point density ($\rho_B$) is represented by the formulae (3), (4) and (5):

$$\rho_B=(-C)[1+(1/\beta)\ln(1-\beta)] \quad (3)$$

$$C=(k'/\lambda k)(N_B/N_L) \quad (4)$$

$$\beta=(n_L+n_B)/(N_L+N_B) \quad (5)$$

wherein $n_L$ is a mole of the bifunctional monomer after reaction; $n_B$ is a mole of a polyfunctional monomer after the reaction; $N_L$ is a mole of the bifunctional monomer before the reaction; $N_B$ is a mole of the polyfunctional monomer before the reaction; k is a reaction rate constant of the first functional group; k' is a reaction rate constant of the second functional group; and λ is a reactivity ratio between the bifunctional monomer and the polyfunctional monomer.

From the formulae (1) and (2), the following equation can be obtained:

$$Mb=M_0/\rho_B \quad (6)$$

Therefore, Mb can be determined by obtaining the branch parameter (λ) or the branch point density ($\rho_B$)

The value of Mb in the present invention is determined by first obtaining the branch parameter (λ) in accordance with a GPC-LALLS method, and then utilizing the formula (1).

In general, Mw/Mb of a polymer prepared by the use of the bifunctional monomer (the bifunctional monomer in the present invention means an ethylene series unsaturated monomer) is 1, and as the amount of the polyfunctional monomer to be used is increased, Mw/Mb becomes larger than 1.

If Mw/Mb of the ethylene series polymer (X) in the present invention is less than 2, the resin strength of the ethylene series polymer (X) is not secured and a copy image is not stable. Moreover, if Mw/Mb is more than 99 or Mw is in excess of 50,000, the resin strength is secured, but the melting fluidity is poor, so that the fixing in a small heat quantity becomes impossible.

If Mw/Mb of the ethylene series polymer (X) is less than 2, a fine powder is formed in large quantities in a toner preparation step, and the toner obtained therefrom tends to break or crack during a long-term use to unpreferably impair image quality. Furthermore, if Mw/Mb is more than 99, a large amount of energy is consumed in a grinding step of the toner preparation process and productivity is also low.

The ethylene series polymer (X) used in the present invention can be prepared by the following methods from which one can be selected in consideration of a substance to be used.

(1) In the case of using a substance having one or more unsaturated functional groups and one or more peroxide groups in the molecule (hereinafter referred to as "copolymerizable peroxide") such as t-butylperoxy methacrylate, t-butylperoxy crotonate, di(t-butylperoxy) fumarate or t-butylperoxyallyl carbonate, the following method is employed, but it is not limited.

The copolymerizable peroxide has a vinyl group and the peroxide group in the molecule, and therefore, if the functional groups of the monomers are polymerized at one time as in a conventional polymerization method, the structure of the molecule cannot be controlled, so that expected physical properties cannot be obtained. Thus, the vinyl group in the copolymerizable peroxide is copolymerized with the bifunctional monomer at a polymerization temperature 15°–40° C. lower than a 10 hours half-life temperature ($t_{1/2}$) of the peroxide group in the copolymerizable peroxide by the use of a catalyst having a 10 hours half-life temperature ($t_{1/2}$) in this temperature range. Afterward, the temperature is raised to not less than the 10 hours half-life temperature ($t_{1/2}$) of the peroxide group in the copolymerizable peroxide to carry out the polymerization, whereby the composition of the main chain and branched chains can be controlled to improve a performance such as offset resistance of a toner. Examples of the usable catalyst include catalysts conventionally used, such as azobisisobutyronitrile (AIBN), benzoyl peroxide (BPO), 3,3,5-trimethylcyclohexanone peroxide, acetyl peroxide, dodecyl peroxide, lauroyl peroxide, 2,2'-azobis(2,4-dimethylvaleronitrile), t-butylperoxy isobutylate and t-butylperoxy-2-ethyl hexanoate.

The amount of the copolymerizable peroxide to be used is preferably from 0.05 to 10 parts by weight based on 100 parts by weight of the bifunctional ethylene series monomer. If the amount of the copolymerizable peroxide is less than 0.05 part by weight, the number of the branch points decreases, so that fluidity cannot be improved. Conversely, if it is more than 10 parts by weight, the number of the branch points excessively increases, so that the branched chains are entangled with each other. In consequence, the compatibility of the polymer (X) with an ethylene series high polymer (Y) to be mixed is poor, and the offset resistance of the toner obtained therefrom is unpreferably poor.

(2) In the case of using a substance having three or more peroxide groups in the molecule (hereinafter referred to as "polyfunctional initiator"), some requirements must be considered. That is, if these polyfunctional initiator are used by the same procedure as in a conventional polymerization method, the weight-average molecular weight of the resultant polymer increases, with the result that the polymer having Mw of 50,000 or less cannot be formed, because of multiple initiating points for polymerization in these initiator. In the present invention, the concentration of the polyfunctional initiator in the system can be adjusted by controlling various factors such as dilution degree, dropping time, reaction temperature and stirring efficiency to obtain the ethylene series polymer (X) having Mw/Mb of 2–99 and Mw of 50,000 or less. If the dilution degree is raised and the dropping time is prolonged, the polymer having Mw of 50,000 or less can be prepared, though production efficiency deteriorates.

Also in the case of using the polyfunctional initiator, a catalyst having a 10 hours half-life temperature ($t_{1/2}$) within the temperature range of the polymerization temperature or so may be used, as in the case of the copolymerizable peroxide.

The amount of the polyfunctional initiator to be used is preferably from 0.01 to 10 parts by weight based on 100 parts by weight of the bifunctional ethylene series monomer. If the amount of the polyfunctional initiator is less than 0.01 part by weight, the molecular weight of the polymer (X) increases, so that the melting fluidity cannot be improved. Conversely, if it is more than 10 parts by weight, the number of the branch points excessively increases, so that the branched chains are entangled with each other. In consequence, the compatibility of the ethylene series polymer (X) with another resin to be used together with the polymer (X) is poor, and the fixing properties and the offset resistance of the toner obtained therefrom are unpreferably poor.

The particularly preferable polyfunctional initiator has four peroxide groups in the molecule.

Typical examples of the polyfunctional initiator include pertrimellitic acid tri-t-butyl ester, pertrimellitic acid tri-t-amyl ester, pertrimellitic acid tri-t-hexyl ester, pertrimellitic acid tri-t-1,1,3,3-tetramethylbutyl ester, pertrimellitic acid tri-t-cumyl ester, pertrimellitic acid tri-t-(p-isopropyl)cumyl ester, pertrimesic acid tri-t-butyl ester, pertrimesic acid tri-t-amyl ester, pertrimesic acid tri-t-hexyl ester, pertrimesic acid tri-t-1,1,3,3,-tetramethylbutyl ester, pertrimesic acid tri-t-cumyl ester, pertrimesic acid tri-t-(p-isopropyl)cumyl ester, 2,2-bis(4,4-di-t-butylperoxycyclohexyl)propane, 2,2-bis(4,4-di-t-amylperoxycyclohexyl)propane, 2,2-bis(4,4-di-t-octylperoxycyclohexyl)propane,2,2-bis(4,4-di-α-cumylperoxycyclohexyl)propane, 2,2-bis(4,4-di-t-butylperoxycyclohexyl)butane and 2,2-bis(4,4di-t-octylperoxycyclohexyl)butane.

As the ethylene series high polymer (Y), there can be used an ethylene series polymer having Mw of 200,000 or more and Mw/Mn of 3 or more, preferably Mw of 200,000 or more and Mw/Mn of 5 or more. The preferable polymer (Y) can be prepared from an ethylene series unsaturated monomer and/or a polyfunctional monomer as a material monomer by a polymerization method such as solution polymerization, suspension polymerization and emulsion polymerization.

If the ethylene series high polymer (Y) having Mw of less than 100,000 is used, the sufficient offset resistance cannot be obtained unpreferably. Furthermore, if the ethylene series high polymer (Y) having Mw/Mn of less than 3 is used, the sufficient offset properties and toner strength cannot be achieved unpreferably.

In addition, the ethylene series high polymer (Y) can be obtained by polymerizing the undermentioned ethylene series unsaturated monomer and/or polyfunctional monomer in the presence of the above-mentioned polyfunctional initiator or a conventional known initiator, and particularly preferable is a polymer having a weight-average molecular weight of 100,000 or more and which can be obtained by the solution polymerization method. As for a mixing ratio between the ethylene series high polymer (Y) and the ethylene series polymer (X), if the ethylene series polymer (X) is less than 15% by weight of the total amount of the binding resin, the toner obtained therefrom has the unsatisfactory melting fluidity and the fixing is poor. Conversely, if the ratio of the ethylene series polymer (X) is more than 85% by weight, the toner strength and the offset resistance are unpreferably poor.

Examples of the ethylene series unsaturated monomer include acrylates such as methyl acrylate, ethyl acrylate, propyl acrylate, n-butyl acrylate, isobutyl acrylate, octyl acrylate, cyclohexyl acrylate, stearyl acrylate, dodecyl acrylate, 2-ethylhexyl acrylate, 2-chloroethyl acrylate, phenyl acrylate, methyl α-chloroacrylate, benzyl acrylate, furfuryl acrylate, tetrahydrofurfuryl acrylate, hydroxyethyl acrylate, hydroxybutyl acrylate, acrylic acid di-methylaminomethyl ester and acrylic acid dimethylaminoethyl ester; methacrylates such as methyl methacrylate, ethyl methacrylate, propyl methacrylate, n-butyl methacrylate, isobutyl methacrylate, octyl methacrylate, dodecyl methacrylate, 2-ethylhexyl methacrylate, phenyl methacrylate, dimethylaminoethyl methacrylate, diethylaminoethyl methacrylate, cyclohexyl methacrylate, stearyl methacrylate, benzyl methacrylate, furfuryl methacrylate, tetrahydrofurfuryl methacrylate, hydroxyethyl methacrylate, hydroxybutyl methacrylate, methacrylic acid dimethylaminomethyl ester and methacrylic acid dimethylaminoethyl ester; aromatic vinyl monomers such as o-methylstyrene, m-methylstyrene, p-methylstyrene, p-ethylstyrene, 2,4-dimethylstyrene, p-n-butylstyrene, p-t-butylstyrene, p-n-hexylstyrene, p-n-octylstyrene, p-n-nonylstyrene, p-n-decylstyrene, p-n-dodecylstyrene, p-methoxystyrene, p-phenylstyrene, 3,4-dichlorostyrene, α-methylstyrene, p-chlorostyrene and styrene; vinylnaphthalenes; ethylene series unsaturated monoolefins such as ethylene, propylene, butylene and isobutylene; vinyl chloride, vinyl bromide, vinyl fluoride, vinyl esters such as vinyl acetate and vinyl propionate; unsaturated dibasic acid dialkyl esters such as dibutyl maleate, dioctyl maleate, dibutyl fumarate and dioctyl fumarate; derivatives of acrylic acid and methacylic acid such as acrylonitrile, methacrylonitrile, acrylamide, methacrylamide, N-substituted methacrylamide and methacrylamidopropanesulfonic acid; vinyl ethers such as vinyl methyl ether, vinyl ethyl ether and vinyl isobutyl ether; vinyl ketones such as vinyl methyl ketone, vinyl hexyl ketone and methyl isopropenyl ketone; unsaturated carboxylic acids such as acrylic acid, methacrylic acid and cinnamic acid; unsaturated dicarboxylic acids such as maleic acid, maleic anhydride, fumaric acid and itaconic acid; unsaturated dicarboxylic acid monoesters such as monomethyl maleate, monoethyl maleate, monobutyl maleate, monooctyl maleate, monomethyl fumarate, monoethyl fumarate, monobutyl fumarate and monooctyl fumarate; and N-vinyl compounds such as N-vinylpyrrole, N-vinylcarbazole, N-vinylindole and N-vinylpyrrolidene. In the present invention, at least one of these monomers can be used. Above all, particularly preferable are acrylates, methacrylates, aromatic vinyl monomers, fumaric acid dialkyl esters, acrylic acid, acrylamide and methacrylamide.

Examples of the above-mentioned polyfunctional monomer include acrylic acid series monomers such as 2,2-bis(4-acryloxypolyethoxyphenyl)propane, 1,3-butylene glycol diacrylate, 1,5-pentanediol diacrylate, neopentyl glycol diacrylate, 1,6-hexanediol diacrylate, diethylene glycol diacrylate, triethylene glycol diacrylate, tetraethylene glycol diacrylate, polyethylene glycol diacrylate, polyethylene glycol #400 diacrylate, polyethylene glycol #600 diacrylate, polypropylene glycol diacrylate, N,N'-methylenebisacrylamide pentaerythritol triacrylate, trimethylolpropane triacrylate, tetramethylolmethane tetraacrylate; methacrylic acid series monomers such as 1,4-butanediol dimethacrylate, ethylene glycol dimethacrylate, 1,3-butylene glycol dimethacrylate, neopentyl glycol dimethacrylate, 1,6-hexanediol dimethacrylate, diethylene glycol dimethacrylate, triethylene glycol dimethacrylate, polyethylene glycol #200 dimethacrylate, polyethylene glycol #400 dimethacrylate, polyethylene glycol #600 dimethacrylate, dipropylene glycol dimethacrylate, polypropylene glycol dimethacrylate, trimethylolethane trimethacrylate, trimethylolpropane trimethacrylate, 2,2-bis(4-methacryloxypolyethoxyphenyl-)propane, aluminum methacrylate, zinc methacrylate, calcium methacrylate and magnesium methacrylate; diallyl phthalate, triallyl cyanurate, triallyl isocyanurate, triallyl trimellitate, ethylene glycol diglycidyl ether acrylate and divinylbenzene.

The resin composition for the electrophotographic toner of the present invention can be obtained by mixing the ethylene series polymer (X) with the ethylene series high polymer (Y), but in order to improve the properties as the composition for the toner, various materials may be added thereto. For example, an amide compound may be added for the purpose of lowering the minimum fixing temperature of the toner to a heat roller.

In the case that the amide compound is used, this amide compound represented by the formula [1] or [2] can be added, when a solvent is removed from the mixture solution of the ethylene series polymer (X) and the ethylene series high polymer (Y), or in a melting/kneading step of the toner preparation process.

$$(R^1\text{—NHCO})_2R^2 \quad [1]$$

wherein each $R^1$ is independently an alkyl group having 7 to 24 carbon atoms or an alkyl group having a hydroxyl group, and $R^2$ is a hydrocarbon group having 1 to 10 carbon atoms, $$(R^3\text{—CONH})_2R^4 \quad [2]$$

wherein each $R^3$ is independently an alkyl group having 7 to 24 carbon atoms or an alkyl group having a hydroxyl group, and $R^4$ is a hydrocarbon group having 1 to 10 carbon atoms.

A typical addition procedure of the amide compound is as follows.

(1) In the case that the amide compound is added at the time when a solvent is removed from the mixture solution of the ethylene series polymer (X) and the ethylene series high polymer (Y), the amide compound which is in a powdery state or which is dissolved in a solvent is added to an apparatus for the solvent removal, followed by stirring and removing the solvent.

(2) In the case that the amide compound is added in the melting/kneading step of the toner preparation process, the mixture of the ethylene series polymer (X) and the ethylene series high polymer (Y) is simultaneously mixed with constitutional materials necessary to prepare the toner and the amide compound, followed by melting and kneading.

Examples of the amide compound having the formula [1] which can be used in the present invention include N,N'-dilauryladipic acid amide, N,N'-distearyladipic acid amide, N,N'-distearylsebacic acid amide and N,N-dibehenyladipic acid amide. Furthermore, examples of the amide compound having the formula [2] include methylenebisstearic acid amide, ethylenebislauric acid amide, ethylenebisstearic acid amide, ethylenebis-12-hydroxystearic acid amide, ethylenebisbehenic acid amide, hexamethylenebisstearic acid amide and o-phenylenebisstearic acid amide.

Preferable commercial products of these amide compounds include Bisamide, Diamide 200 bis and Rublon (they are made by Nihon Suiso Kogyo Co., Ltd.), Plastflow (made by Nitto Chemical Industry Co., Ltd.), Alflow 50S, Alflow 50F and Alfow V-60 (they are made by Nippon Oils & Fats Co., Ltd.), Amide-6L, Amide-7S and Amide 6H (they are made by Kawaken Fine Chemical Co., Ltd.), Armowax EBS (made by Lion Armar Co., Ltd.), Hoechst Wax C (made by Hoechst Japan Co., Ltd.), Nobuko Wax 22-DS (made by Nobuko Chemical Co., Ltd.), Adbar Wax-280 (made by Advance Co., Ltd.), Kao-Wax-EB (made by Kao Soap Co., Ltd.), and Varisin 285 (made by Baker Casta Oil Co., Ltd.). Above all, Alflow 50S, Alflow 50F and Alfow V-60 are preferable.

With regard to these amide compounds, in general the greater the carbon number of an aliphatic hydrocarbon group ($R^1$ or $R^3$) and the length of an alkylene chain ($R^2$ or $R^4$) are, the higher a softening point is. However, the softening point is preferably in the range of from 100° to 150° C. from the viewpoints of low-temperature fixing properties and blocking properties of the toner.

The amount of the amide compound to be used is from 0.5 to 10 parts by weight, preferably from 1 to 8 parts by weight based on 100 parts by weight of the mixture of the ethylene series polymer (X) and the ethylene series high polymer (Y). The amide compound in this range has the effect of further lowering the minimum fixing temperature. If the amount of the amide compound is less than 0.5 part by weight, any addition effect of the amide compound cannot be obtained, and if it is more than 10 parts by weight, a glass transition temperature of the resin composition for toner noticeably drops, so that developing properties and transfer properties decline and hence a good visible image cannot be formed. Furthermore, the amide compound adheres to an electrostatic image support to form a film thereon, so that the function of the support is impeded and blocking resistance is seriously impaired. In addition, the problem of developing sleeve also takes place.

For the purpose of improving the offset resistance, polyolefin waxes may be added to the resin composition for the electrophotographic toner of the present invention. In this case, in order to improve the dispersion properties of various additives inclusive of the polyolefin waxes, it is preferable to add at least one selected from the group consisting of block copolymers comprising an ethylene series hydrocarbon and/or a conjugated diene series hydrocarbon and styrene, hydrogenated products of these block copolymers and polypropylene-modified polystyrene graft copolymers. These polymers can be used singly or in combination.

The block copolymer comprising the ethylene series hydrocarbon and/or the conjugated diene series hydrocarbon and styrene, or the hydrogenated product of the block copolymer can be prepared by polymerizing one or more of ethylene, propylene, 1-butene, 2-butene, isobutylene, 1-pentene, 2-pentene, 2-methyl-1-butene, 3-methyl-1-butene, 2-methyl-2-butene, 1-hexene and 2,3-dimethyl-2-butene as the ethylene series hydrocarbon, and butadiene and isoprene as the conjugated series diene hydrocarbon in accordance with a known living anionic polymerization or a living cationic polymerization to form a block polymer having a reactive group at its terminal, and then blocking this reactive group with styrene. This preparation method is not limited, and in general, a known method can be employed.

The above-mentioned block copolymer may be hydrogenated in a usual manner, and it can be used in the form of the hydrogenated copolymer.

Typical commercial products of the block copolymer include Creiton and Kaliflex TR (they are made by Shell Chemicals Co., Ltd.), Septon (made by Kuraray Co., Ltd.), Taftec, Tafplen, Solplen and Asaplen (they are made by Asahi Chemical Industry Co., Ltd.), Raban (made by Mitsubishi Petrochemical Co., Ltd.), Sumitomo TPE-SB (made by Sumitomo Chemical Co., Ltd.), Elastomer AR (made by Aron Chemicals Co., Ltd.), JSR TR (Japan Synthetic Rubber Co., Ltd.), Denka STR (made by Denki Kagaku Kogyo K.K.), and Yoroprene SOL-T (Toyo Soda Mfg. Co., Ltd.).

Preferable commercial products of the above-mentioned polypropylene-modified polystyrene graft copolymer include Modiper (made by Nippon Oils & Fats Co., Ltd.) and VMX (made by Mitsubishi Petrochemical CO., Ltd.).

The amount of the block copolymer and/or the graft copolymer as the dispersant is from 0.5 to 25 parts by weight based on 100 parts by weight of the mixture of the ethylene series polymer (X) and the ethylene series high polymer (Y), and the amount of the polyolefin wax is from 5 to 35 parts by weight based on 100 parts by weight of the mixture of the polymer (X) and the high polymer (Y). If the dispersant is less than 0.5 part by weight, the effect of dispersing the polyolefin wax is low, so that the uniformity of the toner properties is poor. Conversely, if it is more than 25 parts, the domain size of the dispersant itself unpreferably excessively increases, and the use of such an excessive amount is not economically preferable. Furthermore, the ratio of polystyrene block in the block copolymer is preferably from 3 to 90% by weight, more preferably from 5 to 70% by weight. If the ratio of the polystyrene block is less than 3% by weight, a fixing roll and a photosensitive material are easily contaminated. Conversely, if it is more than 90% by weight, the strength of the toner obtained therefrom declines unpreferably.

The above-mentioned polyolefin wax is used in an amount in the range of from 5 to 35 parts by weight, but if the effect of the polyolefin wax is sufficient in an amount of 5 parts by weight or less, it is not necessary to use any dispersant. In short, in the resin composition for the toner in which 5 parts by weight or more of the polyolefin wax are required, 0.5 to 25 parts by weight of the dispersant are used.

The dispersant and the polyolefin wax may be added (1) at the time of the polymerization of the ethylene series polymer (X) or the ethylene series high polymer (Y), (2) when a solvent is removed from the mixture solution of the ethylene series polymer (X) and the ethylene series high polymer (Y), or (3) in the melting/kneading step in the manufacturing process of the resin composition for the toner. Alternatively, they may be divided and then added in plural steps.

The polyolefin wax which can be used in the resin composition for the toner of the present invention containing the ethylene series polymer (X) and the ethylene series high polymer (Y) as the main components preferably has a low molecular weight. The low-molecular weight polyolefin wax may be either of an unmodified polyolefin wax and a modified polyolefin wax in which a modified component is blocked with or grafted on an olefin component.

The olefin component of the unmodified polyolefin wax or the modified polyolefin wax may be either type of a homopolymer type obtained from a single olefin monomer and a copolymer type obtained by copolymerizing the olefin monomer with another copolymerizable monomer.

Examples of the above-mentioned olefin monomer include ethylene, propylene, 1-butene, 1-pentene, 3-methyl-1-butene, 3-methyl-1-pentene and all the other olefins. Furthermore, examples of the other monomer copolymerizable with the olefin monomer include other olefin monomers, vinyl ethers such as vinyl methyl ether, vinyl esters such as vinyl acetate, halogenated olefins such as vinyl fluoride, acrylates and methacrylates such as methyl acrylate and methyl methacrylate, derivatives of acrylic acid such as acrylonitrile, and organic acids such as acrylic acid and methacrylic acid. In the case that the olefin component is brought into the copolymer type, it is possible to form a copolymer type such as ethylene-propylene copolymer, ethylene-butene copolymer, ethylene-vinyl acetate copolymer, ethylene-vinyl methyl ether copolymer or ethylenepropylene-vinyl acetate copolymer. In the case that the monomer other than the olefin monomer is used to form the copolymer type, it is preferred that a ratio of the olefin portion obtained from the olefin monomer in the polyolefin wax is 50 mole % or more.

Examples of the modified component in the modified polyolefin wax include aromatic vinyl monomers such as 1-phenylpropene, styrene, p-ethylstyrene and p-n-butylstyrene, α-methylene fatty acid monocarboxylic ester monomers such as methyl acrylate, ethyl acrylate, methyl methacrylate and ethyl methacrylate. In the case that the aromatic vinyl monomer is used as the modified component, a ratio of the modified component to the modified polyolefin is in the range of from 0.1 to 15 parts by weight, particularly from 1 to 10 parts by weight. Furthermore, in the case that the α-methylene fatty acid monocarboxylic ester monomer is used as the modified component, a ratio of the modified component to the modified polyolefin is preferably in the range of from 0.1 to 50 parts by weight, more preferably from 1 to 40 parts by weight.

It is desirable that the unmodified polyolefin wax or the modified polyolefin wax itself has a low softening point, and for example, the softening point measured in accordance with a ring and ball method stipulated in JIS K2531-1960 is preferably from 80° to 180° C., more preferably from 90° to 160° C.

Typical commercial products of the polyolefin wax include Biscol 660P and Biscol 550P (they are made by Sanyo Chemical Industries, Ltd.), Polyethylene 6A (made by Araid Chemicals Co., Ltd.), Hiwax 400P, Hiwax 100P, Hiwax 200P, Hiwax 320P and Hiwax 220P, Hiwax 2203P and Hiwax 4202P (made by Mitsui Petrochemical Industries, Ltd.), and Hoechst Wax PE520, Hoechst Wax PE130 and Hoeschst PE190 (they are made by Hoechst Japan Co., Ltd.). Other examples of the polyolefin wax include a polyethylene wax formed by block-copolymerizing with or graft-copolymerizing on methyl methacrylate, a polyethylene wax formed by block-copolymerizing with or graft-copolymerizing on butyl methacrylate, and a polyethylene wax formed by block-copolymerizing with or graft-copolymerizing on styrene. These polyolefins are usually used in the melting/kneading step of the toner manufacturing process, but it may be added at the time of the polymerization of the ethylene series polymer or in the solvent removal step.

In the present invention, the above-mentioned ethylene series high polymer (Y) having Mw of 100,000 or more and Mw/Mn of 3.0 or more is preferably be used. It is more preferable in the viewpoint of the offset resistance that a high polymer have a weight-average molecular weight of 100,000 or more and a Z average molecular weight of 850,000 or more which is prepared by using a compound having 3 or more peroxide groups in one molecule as an initiator in accordance with a solution polymerization method.

The binding resin comprising the ethylene series polymer (X) and the ethylene series high polymer (Y) is usually used in an amount of from 50 to 95% by weight in the resin composition for the toner. To the binding resin, there can be added, if necessary, for example, polyvinyl chloride, polyolefin, polyester, polyvinyl butyral, polyurethane, polyamide, rosin, terpene resin, phenol resin, epoxy resin, palaphin wax and/or polyolefin wax in such an amount as not to impair the effect of the present invention. In the resin composition for the electrophotographic toner of the present invention using the ethylene series polymers (X) and (Y), a colorant is usually used. Examples of the usable colorant include black pigments such as carbon black, acetylene black, lamp black and magnetite, and known pigments such as chrome yellow, yellow iron oxide, Hansa Yellow G, Quinoline Yellow Lake, Permanent Yellow, NCG Molybdenum Orange, Vulcan Orange, Indanthrene, Brilliant Orange GK, red ion oxide, Brilliant Carmine 6B, Fulyzaline Lake, Fast Violet B, cobalt blue, alkali blue lake, phthalocyanine blue, a metal complex of a monoazo dye, Fast Sky Blue, Pigment Green B, Malachite Green Lake, titanium oxide and zinc oxide. The amount of the colorant is usually in the range of from 5 to 300 parts by weight based on 100 parts by weight of the binding resin. To the resin composition for the electrophotographic toner of the present invention, there can be suitably added a known charging regulator, pigment dispersant and offset inhibitor such as Nigrosine, a quaternary ammonium salt, a metal-containing azo dye and a metallic salt of a fatty acid, and the toner can be prepared by the known procedure. That is, the binding resin to which the above-mentioned various additives are added is premixed in a Henschel mixer, kneaded in a heating and melting state by a kneader, cooled, finely ground by the use of a jet grinder, and then classified by a classifier, and the resultant particles in the range of usually from 8 to 20 μm are collected to obtain the toner.

In order to obtain the magnetic toner, a magnetic powder may be contained. Examples of this magnetic powder include powders of a ferromagnetic material which can be magnetized in a magnetic field, iron, nickel, cobalt and alloys such as magnetite and ferrite. A ratio of this magnetic powder is preferably in the range of from 15 to 70 parts by weight based on the weight of the toner.

Moreover, in the present invention, a release agent may be suitably used at the time of the polymerization or in the melting/kneading step, as described hereinafter. The release agent referred to herein is brought into contact with a fixing roller at the fixing to contribute to the decrease in friction, the improvement of release properties or the improvement of fluidity at the melting. Examples of the release agent include paraffin waxes, higher (saturated straight-chain) fatty acids (having 12–50 carbon atoms), higher alcohols (having 8–32 carbon atoms), metallic salts of fatty acids, fatty amides, metallic soaps and polyvalent alcohols.

In the toner, if necessary, a charging regulator, a colorant and a powdery fluidity modifier may be mixed with (externally added to) the toner particles. Examples of the charging regulator include a metal-containing dye and Nigrosine, and examples of the powdery fluidity modifier include colloidal silica and metallic salts of fatty acids. For the purpose of weight increase, a filler such as calcium carbonate or finely powdery silica may be blended with the toner in an amount of 0.5 to 20 parts by weight. Furthermore, with the purpose of preventing the toner particles from mutually cohering so as to improve the powder fluidity, a powder fluidity improver such as a Teflon fine powder may be blended.

In the method for obtaining the ethylene series polymers (X) and (Y) of the present invention, the various additives may be dissolved and dispersed in the monomers prior to the polymerization.

The resin composition for the electrophotographic toner of the present invention in which the ethylene series polymers (X) and (Y) are the main constitutional components of the binding resin can be applied to all of known development methods. Examples of the development methods include two-component development methods such as a Cascade method, a magnetic brush method and a microtoning method; one-component development methods such as a conductive one-component development method, an insulating one-component development method and a jumping development method; a powder cloud method and a fur brush method; a non-magnetic one-component development method in which the toner is supported on a toner carrier by electrostatic force and transferred to a development step.

EXAMPLES

Next, the present invention will be described in more detail in reference to examples, but the scope of the present invention should not be limited by these examples. Incidentally, "part" and "parts" in the examples mean part by weight and parts by weight, respectively, unless otherwise noted.

1. Preparation Examples of ethylene series polymer (X) of the present invention

Polymerization was carried out using monomers and catalyst compositions under reaction conditions shown in Table 1 to obtain ethylene series polymers (X).

TABLE 1

| | Preparation Examples of Ethylene Series Polymers (X) | | | | | |
|---|---|---|---|---|---|---|
| Prep. Example No. | Prep. Example 1 | Prep. Example 2 | Prep. Example 3 | Prep. Example 4 | Prep. Example 5 | Prep. Example 6 |
| Polymer No. | Polymer 1 | Polymer 2 | Polymer 3 | Polymer 4 | Polymer 5 | Polymer 6 |
| Xylene (Xy) | 100.0 | →→ | →→ | 200.0 | 100.0 | →→ |
| Styrene (St) | 60, 30 | →→ | →→ | 100.0 | →→ | →→ |
| t-Butyl-peroxyallyl carbonate | 0.05 | 5.0 | 10.0 | 0.0 | →→ | →→ |
| Pertrimellitic acid tri-t-butyl ester | 0.0 | →→ | →→ | 0.01 | 3.0 | 5.0 |
| 2,2-Bis(4,4-di-t-butylperoxy-cyclohexyl)-propane | 0.0 | →→ | →→ | →→ | →→ | →→ |
| 2,2'-Azobis-(2,4-dimethyl-valeronitrile) | 1 | →→ | →→ | 0.0 | →→ | →→ |
| t-Butylper-oxy-2-ethyl hexanoate | 0.0 | →→ | →→ | →→ | →→ | →→ |
| Polymeri-zation temperature (°C.) | 70, 110 | →→ | →→ | 145.0 | →→ | →→ |
| Polymeri-zation time (hr) | 2, 3 | →→ | →→ | 8.0 | →→ | →→ |
| Mw | 12,000 | 49,000 | 50,000 | 50,000 | 41,000 | 20,000 |
| Mw/Mn | 2.6 | 3.7 | 3.9 | 3.4 | 4.2 | 4.1 |
| Mw/Mb | 2.5 | 26.9 | 92.1 | 3.5 | 29.5 | 89.1 |
| Prep. Example No. | Prep. Example 7 | Prep. Example 8 | Prep. Example 9 | Prep. Example 10 | Prep. Example 11 | Prep. Example 12 |
| Polymer No. | Polymer 7 | Polymer 8 | Polymer 9 | Polymer 10 | Polymer 11 | Polymer 12 |
| Xylene (Xy) | 200.0 | 100.0 | →→ | →→ | →→ | →→ |
| Styrene (St) | 100.0 | →→ | →→ | →→ | →→ | →→ |
| t-Butyl-peroxyallyl carbonate | 0.0 | →→ | →→ | →→ | →→ | →→ |
| Pertrimellitic acid tri-t-butyl ester | 0.0 | →→ | →→ | →→ | →→ | →→ |
| 2,2-Bis(4,4-di-t-butylperoxy-cyclohexyl)-propane | 0.01 | 3.0 | 5.0 | 0.0 | →→ | →→ |
| 2,2'-Azobis-(2,4-dimethyl- | 0.0 | →→ | →→ | →→ | →→ | →→ |

TABLE 1-continued

| | Preparation Examples of Ethylene Series Polymers (X) | | | | | |
|---|---|---|---|---|---|---|
| valeronitrile) | | | | | | |
| t-Butylper-oxy-2-ethyl hexanoate | 0.0 | →→ | →→ | 25.0 | 15.0 | 5.0 |
| Polymerization temperature (°C.) | 145.0 | →→ | →→ | →→ | →→ | →→ |
| Polymerization time (hr) | 8.0 | →→ | →→ | 5.0 | →→ | →→ |
| Mw | 49,000 | 42,000 | 31,000 | 22,000 | 43,000 | 89,000 |
| Mw/Mn | 3.6 | 4.3 | 5.0 | 2.1 | 2.7 | 2.4 |
| Mw/Mb | 3.7 | 32.9 | 96.4 | 1.5 | 1.9 | 2.1 |

*"→→" means the same value as in the left column.
*In the preparation examples of Polymers 1 to 3, two-stage polymerization was carried out, and in the-columns of each preparation example, there are shown styrene amounts, polymerization temperatures and polymerization times in the first stage and the second stage.

2. Preparation Examples of ethylene series high polymer (Y) of the present invention Polymerization was carried out using monomers and catalyst compositions under reaction conditions shown in Table 2 to obtain ethylene series high polymers (Y).

TABLE 2

| | Preparation Examples of Ethylene Series High Polymers (Y) | | | | | |
|---|---|---|---|---|---|---|
| Prep. Example No. | Prep. Example 13 | Prep. Example 14 | Prep. Example 15 | Prep. Example 16 | Prep. Example 17 | Prep. Example 18 |
| Polymer No. | Polymer 13 | Polymer 14 | Polymer 15 | Polymer 16 | Polymer 17 | Polymer 18 |
| Bulk Polymerization | | | | | | |
| Styrene (Xy) | 72.0 | →→ | 80.0 | →→ | 72.0 | →→ |
| n-Butyl acrylate | 28.0 | →→ | 20.0 | 15.0 | 28.0 | →→ |
| Maleic acid | 0.0 | →→ | →→ | 5.0 | 0.0 | →→ |
| Polymerization temperature (°C.) | 120 | 110 | 120 | →→ | →→ | →→ |
| Polymerization time (hr) | 10.0 | →→ | →→ | →→ | 5.0 | 10.0 |
| Polymerization ratio (%) | 55.1 | — | — | — | — | — |
| Dilution | | | | | | |
| Xylene (Xy) | 130.0 | →→ | →→ | →→ | →→ | →→ |
| Solution Polymerization | | | | | | |
| Xylene (Xy) | 50.0 | →→ | →→ | →→ | →→ | →→ |
| Di-t-Butyl-peroxide | 0.1 | →→ | →→ | →→ | →→ | 0.8 |
| Pertrimellitic acid tri-t-butyl ester | 0.0 | →→ | →→ | →→ | →→ | →→ |
| 2,2-Bis(4,4-di-t-butylperoxy-cyclohexyl)-propane | 0.0 | →→ | →→ | →→ | →→ | →→ |
| Divinyl benzene | 0.0 | →→ | →→ | →→ | →→ | →→ |
| Polymerization temperature (°C.) | 130 | →→ | →→ | →→ | →→ | →→ |
| Feed time (hr) | 8.0 | →→ | →→ | →→ | →→ | →→ |
| Mw | 337,000 | 357,000 | 355,000 | 328,000 | 311,000 | 389,000 |
| Mw/Mn | 5.3 | 6.4 | 5.1 | 5.6 | 5.8 | 6.0 |

TABLE 2-continued

Preparation Examples of Ethylene Series High Polymers (Y)

| Prep. Example No. | Prep. Example 19 | Prep. Example 20 | Prep. Example 21 | Prep. Example 22 | Prep. Example 23 | Prep. Example 24 |
|---|---|---|---|---|---|---|
| Polymer No. | Polymer 19 | Polymer 20 | Polymer 21 | Polymer 22 | Polymer 23 | Polymer 24 |
| Bulk Polymerization | | | | | | |
| Styrene (Xy) | 72.0 | →→ | →→ | →→ | →→ | →→ |
| n-Butyl acrylate | 28.0 | →→ | →→ | →→ | →→ | →→ |
| Maleic acid | 0.0 | →→ | →→ | →→ | →→ | →→ |
| Polymerization temperature (°C.) | 120 | 98 | 90 | 98 | →→ | →→ |
| Polymerization time (hr) | 10.0 | →→ | →→ | →→ | →→ | →→ |
| Polymerization ratio (%) | — | 55.0 | — | — | — | — |
| Dilution | | | | | | |
| Xylene (Xy) | 130.0 | →→ | →→ | →→ | →→ | →→ |
| Solution Polymerization | | | | | | |
| Xylene (Xy) | 50.0 | →→ | →→ | →→ | →→ | →→ |
| Di-t-Butylperoxide | 0.1 | 0.0 | →→ | →→ | →→ | →→ |
| Pertrimellitic acid tri-t-butyl ester | 0.0 | 0.01 | →→ | 0.0 | 1.0 | 0.0 |
| 2,2-Bis(4,4-di-t-butylperoxycyclohexyl)-propane | 0.0 | →→ | →→ | 0.01 | 0.0 | 1.0 |
| Divinyl benzene | 3.0 | 0.0 | →→ | →→ | →→ | →→ |
| Polymerization temperature (°C.) | 130 | →→ | →→ | →→ | →→ | →→ |
| Feed time (hr) | 8.0 | →→ | →→ | →→ | →→ | →→ |
| Mw | 426,000 | 387,000 | 401,000 | 405,000 | 378,000 | 361,000 |
| Mw/Mn | 8.9 | 5.3 | 6.4 | 5.1 | 8.9 | 7.3 |

With regard to molecular weights of the ethylene series polymers (X) and the ethylene series high polymers (Y) obtained in the above-mentioned preparation examples, Mw (weight-average molecular weight) was determined by using tetrahydrofuran as a solvent and GPC utilizing a refractometer as a detector on the basis of a commercially available single dispersion standard polystyrene, and Mb (weight-average molecular weight between crosslinking points) was determined from a measured branch parameter (λ) in accordance with the formula (1) by a GPC-LALLS method.

| | |
|---|---|
| Detector: | SHODEX RI SE-31 |
| Column: | A-80M × 2 + KF-802 |
| Solvent: | THF (tetrahydrofuran) |
| Discharge rate: | 1.2 ml/min. |
| Sample: | 0.25% THF solution |

3. Preparation Example of Binding Resin (1) An ethylene series polymer (X) obtained by the above-mentioned procedure or its polymer solution was mixed with an ethylene series high polymer (Y) in each ratio shown in Tables 3 to 5, followed by the removal of a solvent, to obtain each binding resin.

4. Preparation Examples of Toner and Results of Evaluation

Examples 1 to 106 and Comparative Examples 1 to 26

100 parts of the above-mentioned binding resin, 10 parts of carbon black (MA-100, made by Mitsubishi Chemical Industries, Ltd.), 5 parts of polypropylene wax and 1 part of Nigrosine dye as a charging regulator were premixed in a Henschel mixer, and they were then kneaded at 170° C. by the use of a twin-screw-kneader. Afterward, the kneaded material was cooled, coarsely ground, finely ground, and then classified by a classifier to obtain toners having particle diameters in the range of from 8 to 20 μm.

The thus obtained toners were evaluated in accordance with the undermentioned items. A duplicator for the evaluation was a commercial duplicator which was reconstructed so that a heat roll temperature might be optionally changed.

Next, evaluation procedures of the respective items will be described.

(1) 70% fixing temperature: A toner layer on an image of a 2 cm×2 cm rush black portion was rubbed 50 times under a load of 300 g/cm$^2$ with a sand eraser by a JIS friction fastness testing machine (made by Daiei Kagaku Seiki Co., Ltd.), and a minimum temperature of a heat roll necessary to exceed a weight residual ratio of 70% on the toner layer was regarded to the 70% fixing temperature.

(2) Hot offset temperature: The temperature of the heat roll was raised, and a temperature at which offset began to occur was regarded as the hot offset temperature.

(3) Blocking properties: 100 g of a toner were placed in a polyethylene bottle, subjected to tapping, and then maintained at 50° C. for 50 hours. The toner was then put on a paraffin paper, and then visually evaluated on the basis of the following evaluation ranking.

⊚: No blocking

○: Slight blocking, but no problem in practice

Δ: Noticeable blocking x: In the state of substantially one mass (4) Toner strength: Coarse particles obtained from grindable masses in each toner manufacturing process were classified, and then finely ground under a grinding pressure of 2.5 kg/cm$^2$ at a feed rate of 20 g/min. by means of a jet grinder. An average particle diameter of the thus obtained toner particles was regarded as an index of the toner strength.

(5) Contamination on photosensitive member: At a point of time when 100,000 sheets were copied, a photosensitive member and a fixing roll were wiped with cotton, and the contamination on the cotton was visually evaluated on the basis of the following evaluation ranking.

⊚: No contamination

○: Slightly black on the cotton

Δ: Noticeably black on the cotton x: Entirely black on the cotton (6) Domain size in binding resin: A block copolymer or a graft copolymer comprising an ethylene series hydrocarbon and/or a conjugated diene series hydrocarbon and styrene or its hydrogenated product was internally added as a dispersant in a solvent removal step of an ethylene series polymer mixture, and the resin was then shot by a transmission type electron microscope. On the shot photographs, the particle diameter of the dispersant in the resin was measured.

(7) Charging stability: The toner particles and a spherical iron oxide powder were mixed in a ratio of 3:97 for 30 hours by a V blender, and triboelectric charge quantities were measured after 30 minutes and after 30 hours. The charging stability was represented with a ratio (an absolute value) calculated by the following formula, and it was evaluated by the following ranking and the toner particles having a ratio of 10% or less were judged to be good.

$$[A-B]\div A$$

wherein

A: charge quantity after 30 minutes

B: charge quantity after 30 hours

○: ≦10%

Δ: 10–14% x: >14%

(8) Image quality (fogging): Copying was continuously carried out, and white portions were compared between the 100th sheet and the 10,000th sheet. The image quality was judged by the degree of the contamination on the white portions by the fly of the toner and the like.

○: Good (not seen by a 30-power magnifier)

Δ: Seen by a 30-power magnifier x: Seen by the naked eye

The results of the evaluation are set forth in Tables 3 to 5.

TABLE 3

| | Ethylene Series Polymer (X) | Ethylene Series High Polymer (Y) | X/Y Weight Ratio | 70% Fixing Temp. (°C.) |
|---|---|---|---|---|
| Example 1 | Polymer 1 | Polymer 13 | 50/50 | 133 |
| Example 2 | Polymer 2 | Polymer 13 | 50/50 | 130 |
| Example 3 | Polymer 3 | Polymer 13 | 50/50 | 130 |
| Example 4 | Polymer 4 | Polymer 13 | 50/50 | 140 |
| Example 5 | Polymer 5 | Polymer 13 | 50/50 | 135 |
| Example 6 | Polymer 6 | Polymer 13 | 50/50 | 135 |
| Example 7 | Polymer 7 | Polymer 13 | 50/50 | 130 |
| Example 8 | Polymer 8 | Polymer 13 | 50/50 | 136 |
| Example 9 | Polymer 9 | Polymer 13 | 50/50 | 134 |
| Example 10 | Polymer 7 | Polymer 19 | 50/50 | 123 |
| Example 11 | Polymer 8 | Polymer 19 | 50/50 | 129 |
| Example 12 | Polymer 9 | Polymer 19 | 50/50 | 128 |
| Example 13 | Polymer 8 | Polymer 19 | 85/15 | 116 |
| Example 14 | Polymer 8 | Polymer 19 | 70/30 | 124 |
| Example 15 | Polymer 8 | Polymer 19 | 30/70 | 135 |
| Example 16 | Polymer 8 | Polymer 19 | 15/85 | 147 |
| Example 17 | Polymer 8 | Polymer 14 | 50/50 | 131 |
| Example 18 | Polymer 8 | Polymer 15 | 50/50 | 124 |
| Example 19 | Polymer 8 | Polymer 16 | 50/50 | 132 |
| Example 20 | Polymer 8 | Polymer 17 | 50/50 | 126 |
| Example 21 | Polymer 8 | Polymer 18 | 50/50 | 129 |
| Example 22 | Polymer 1 | Polymer 20 | 50/50 | 131 |
| Example 23 | Polymer 2 | Polymer 20 | 50/50 | 131 |
| Example 24 | Polymer 3 | Polymer 20 | 50/50 | 125 |
| Example 25 | Polymer 4 | Polymer 20 | 50/50 | 133 |
| Example 26 | Polymer 5 | Polymer 20 | 50/50 | 130 |
| Example 27 | Polymer 6 | Polymer 20 | 50/50 | 130 |
| Example 28 | Polymer 7 | Polymer 20 | 50/50 | 140 |
| Example 29 | Polymer 8 | Polymer 20 | 50/50 | 135 |
| Example 30 | Polymer 9 | Polymer 20 | 50/50 | 135 |
| Example 31 | Polymer 8 | Polymer 21 | 50/50 | 130 |
| Example 32 | Polymer 8 | Polymer 22 | 50/50 | 136 |
| Example 33 | Polymer 8 | Polymer 23 | 50/50 | 134 |
| Example 34 | Polymer 8 | Polymer 24 | 50/50 | 123 |
| Example 35 | Polymer 8 | Polymer 20 | 85/15 | 118 |
| Example 36 | Polymer 8 | Polymer 20 | 70/30 | 129 |
| Example 37 | Polymer 8 | Polymer 20 | 30/70 | 138 |
| Example 38 | Polymer 8 | Polymer 20 | 15/85 | 146 |
| Comp. Ex. 1 | Polymer 10 | Polymer 13 | 50/50 | 142 |
| Comp. Ex. 2 | Polymer 11 | Polymer 13 | 50/50 | 149 |
| Comp. Ex. 3 | Polymer 12 | Polymer 13 | 50/50 | 156 |
| Comp. Ex. 4 | Polymer 10 | Polymer 19 | 50/50 | 147 |
| comp. Ex. 5 | Polymer 11 | Polymer 19 | 50/50 | 154 |
| Comp. Ex. 6 | Polymer 12 | Polymer 19 | 50/50 | 159 |
| Comp. Ex. 7 | Polymer 10 | Polymer 20 | 50/50 | 144 |
| Comp. Ex. 8 | Polymer 11 | Polymer 20 | 50/50 | 145 |
| Comp. Ex. 9 | Polymer 12 | Polymer 20 | 50/50 | 151 |
| Comp. Ex. 10 | Polymer 8 | Polymer 19 | 95/5 | 111 |
| comp. Ex. 11 | Polymer 8 | Polymer 19 | 5/95 | 142 |
| Comp. Ex. 12 | Polymer 8 | Polymer 20 | 95/5 | 108 |
| Comp. Ex. 13 | Polymer 8 | Polymer 20 | 5/95 | 161 |

| | Hot offset Temp. (°C.) | Blocking Properties | Toner Strength (μm) | Contamination of Photosensitive Member | Image Quality (Fogging) |
|---|---|---|---|---|---|
| Example 1 | 205 | ○ | 17 | ⊚ | ○ |

TABLE 3-continued

| | | | | | |
|---|---|---|---|---|---|
| Example 2 | 215 | ○ | 20 | ◎ | ○ |
| Example 3 | 220 | ○ | 25 | ○ | Δ |
| Example 4 | 201 | ◎ | 19 | ◎ | ○ |
| Example 5 | 215 | ◎ | 26 | ◎ | ○ |
| Example 6 | 215 | ◎ | 31 | ◎ | ○ |
| Example 7 | 225 | ○ | 21 | ◎ | ○ |
| Example 8 | 212 | ◎ | 24 | ◎ | ○ |
| Example 9 | 216 | ○ | 29 | ○ | ○ |
| Example 10 | 214 | Δ | 17 | ◎ | ○ |
| Example 11 | 217 | ○ | 23 | ◎ | ○ |
| Example 12 | 220 | ○ | 24 | ○ | Δ |
| Example 13 | 208 | ○ | 15 | ○ | Δ |
| Example 14 | 214 | ○ | 18 | ○ | ○ |
| Example 15 | 223 | ○ | 24 | ◎ | ○ |
| Example 16 | 236 | ◎ | 30 | ◎ | ○ |
| Example 17 | 217 | ◎ | 28 | ◎ | ○ |
| Example 18 | 217 | ○ | 20 | ○ | Δ |
| Example 19 | 226 | ◎ | 22 | ◎ | ○ |
| Example 20 | 215 | ○ | 16 | ◎ | ○ |
| Example 21 | 217 | ○ | 21 | ○ | ○ |
| Example 22 | 223 | ◎ | 24 | ○ | ○ |
| Example 23 | 226 | ◎ | 13 | ◎ | ○ |
| Example 24 | 225 | ○ | 19 | ◎ | Δ |
| Example 25 | 205 | ◎ | 17 | ◎ | ○ |
| Example 26 | 215 | ○ | 20 | ◎ | ○ |
| Example 27 | 220 | ○ | 25 | ○ | ○ |
| Example 28 | 201 | ◎ | 19 | ◎ | ○ |
| Example 29 | 215 | ◎ | 26 | ◎ | ○ |
| Example 30 | 215 | ◎ | 31 | ◎ | ○ |
| Example 31 | 225 | ○ | 21 | ◎ | ○ |
| Example 32 | 212 | ◎ | 24 | ◎ | ○ |
| Example 33 | 216 | ◎ | 29 | ○ | ○ |
| Example 34 | 214 | ○ | 17 | ◎ | ○ |
| Example 35 | 206 | ○ | 15 | ○ | ○ |
| Example 36 | 210 | ◎ | 22 | ○ | ○ |
| Example 37 | 222 | ○ | 30 | ◎ | ○ |
| Example 38 | 229 | ○ | 34 | ◎ | ○ |
| Comp. Ex. 1 | 219 | ○ | 8 | ○ | Δ |
| Comp. Ex. 2 | 215 | ○ | 10 | ○ | Δ |
| Comp. Ex. 3 | 216 | ◎ | 13 | ○ | ○ |
| Comp. Ex. 4 | 214 | ◎ | 8 | ○ | Δ |
| Comp. Ex. 5 | 218 | ◎ | 9 | ○ | ○ |
| Comp. Ex. 6 | 225 | ◎ | 14 | ○ | ○ |
| Comp. Ex. 7 | 217 | ○ | 9 | ○ | ○ |
| Comp. Ex. 8 | 218 | ○ | 11 | ○ | ○ |
| Comp. Ex. 9 | 224 | ◎ | 20 | ○ | ○ |
| Comp. Ex. 10 | 209 | Δ | 10 | Δ | X |
| Comp. Ex. 11 | 231 | X | 36 | ◎ | ○ |
| Comp. Ex. 12 | 198 | Δ | 12 | Δ | X |
| Comp. Ex. 13 | 236 | X | 41 | ○ | ○ |

TABLE 4

| | Ethylene Series Polymer (X) | Ethylene Series High Polymer (Y) | X/Y Weight Ratio | Amide Com-pound | Amount of Amide | 70% Fixing Temp. (°C.) |
|---|---|---|---|---|---|---|
| Example 39 | Polymer 1 | Polymer 19 | 50/50 | (I) | 0.25 | 123 |
| Example 40 | Polymer 1 | Polymer 19 | 50/50 | (I) | 3.00 | 115 |
| Example 41 | Polymer 1 | Polymer 19 | 50/50 | (I) | 5.00 | 110 |
| Example 42 | Polymer 1 | Polymer 19 | 50/50 | (II) | 0.25 | 124 |
| Example 43 | Polymer 1 | Polymer 19 | 50/50 | (II) | 3.00 | 117 |
| Example 44 | Polymer 1 | Polymer 19 | 50/50 | (II) | 5.00 | 108 |
| Example 45 | Polymer 1 | Polymer 19 | 50/50 | (III) | 0.25 | 124 |
| Example 46 | Polymer 1 | Polymer 19 | 50/50 | (III) | 3.00 | 114 |
| Example 47 | Polymer 1 | Polymer 19 | 50/50 | (III) | 5.00 | 106 |
| Example 48 | Polymer 8 | Polymer 19 | 50/50 | (I) | 0.25 | 124 |
| Example 49 | Polymer 8 | Polymer 19 | 50/50 | (I) | 3.00 | 120 |
| Example 50 | Polymer 8 | Polymer 19 | 50/50 | (I) | 5.00 | 111 |
| Example 51 | Polymer 8 | Polymer 19 | 50/50 | (II) | 0.25 | 125 |
| Example 52 | Polymer 8 | Polymer 19 | 50/50 | (II) | 3.00 | 119 |
| Example 53 | Polymer 8 | Polymer 19 | 50/50 | (II) | 5.00 | 113 |
| Example 54 | Polymer 8 | Polymer 19 | 50/50 | (III) | 0.25 | 125 |
| Example 55 | Polymer 8 | Polymer 19 | 50/50 | (III) | 3.00 | 118 |
| Example 56 | Polymer 8 | Polymer 19 | 50/50 | (III) | 5.00 | 109 |
| Example 57 | Polymer 1 | Polymer 20 | 50/50 | (I) | 0.25 | 126 |
| Example 58 | Polymer 1 | Polymer 20 | 50/50 | (I) | 3.00 | 119 |
| Example 59 | Polymer 1 | Polymer 20 | 50/50 | (I) | 5.00 | 109 |
| Example 60 | Polymer 8 | Polymer 20 | 50/50 | (I) | 0.25 | 129 |
| Example 61 | Polymer 8 | Polymer 20 | 50/50 | (I) | 3.00 | 121 |
| Example 62 | Polymer 8 | Polymer 20 | 50/50 | (I) | 5.00 | 116 |
| Example 63 | Polymer 1 | Polymer 19 | 85/15 | (I) | 3.00 | 110 |
| Example 64 | Polymer 1 | Polymer 19 | 70/30 | (I) | 3.00 | 119 |
| Example 65 | Polymer 1 | Polymer 19 | 30/70 | (I) | 3.00 | 129 |
| Example 66 | Polymer 1 | Polymer 19 | 15/85 | (I) | 3.00 | 137 |
| Example 67 | Polymer 8 | Polymer 19 | 85/15 | (I) | 3.00 | 109 |
| Example 68 | Polymer 8 | Polymer 19 | 70/30 | (I) | 3.00 | 117 |
| Example 69 | Polymer 8 | Polymer 19 | 30/70 | (I) | 3.00 | 126 |
| Example 70 | Polymer 8 | Polymer 19 | 15/85 | (I) | 3.00 | 134 |
| Comp. Ex. 14 | Polymer 10 | Polymer 19 | 50/50 | (I) | 3.00 | 119 |
| Comp. Ex. 15 | Polymer 11 | Polymer 19 | 50/50 | (I) | 3.00 | 124 |
| Comp. Ex. 16 | Polymer 12 | Polymer 19 | 50/50 | (I) | 3.00 | 127 |
| Comp. Ex. 17 | Polymer 10 | Polymer 20 | 50/50 | (I) | 3.00 | 126 |
| Comp. Ex. 18 | Polymer 11 | Polymer 20 | 50/50 | (I) | 3.00 | 124 |
| Comp. Ex. 19 | Polymer 12 | Polymer 20 | 50/50 | (I) | 3.00 | 129 |
| Comp. Ex. 20 | Polymer 1 | Polymer 19 | 95/5 | (I) | 3.00 | 102 |
| Comp. Ex. 21 | Polymer 1 | Polymer 19 | 5/95 | (I) | 3.00 | 143 |
| Comp. Ex. 22 | Polymer 8 | Polymer 19 | 95/5 | (I) | 3.00 | 103 |
| Comp. Ex. 23 | Polymer 8 | Polymer 19 | 5/95 | (I) | 3.00 | 151 |

TABLE 4-continued

| | Hot Offset Temp. (°C.) | Blocking Properties | Toner Strength (μm) | Contamination of Photosensitive Member | Charge Stability | Image Quality (Fogging) |
|---|---|---|---|---|---|---|
| Example 39 | 215 | ○ | 17 | ◎ | ○ | ○ |
| Example 40 | 213 | ○ | 20 | ◎ | ○ | ○ |
| Example 41 | 209 | Δ | 25 | ○ | ○ | ○ |
| Example 42 | 211 | ○ | 19 | ◎ | ○ | ○ |
| Example 43 | 210 | ○ | 26 | ○ | ○ | ○ |
| Example 44 | 210 | ○ | 31 | ○ | ○ | Δ |
| Example 45 | 214 | ○ | 21 | ◎ | ○ | ○ |
| Example 46 | 214 | ○ | 24 | ◎ | ○ | ○ |
| Example 47 | 210 | ○ | 29 | ○ | Δ | Δ |
| Example 48 | 215 | ○ | 17 | ◎ | ○ | ○ |
| Example 49 | 214 | ○ | 23 | ◎ | ○ | ○ |
| Example 50 | 210 | ○ | 24 | ○ | ○ | ○ |
| Example 51 | 213 | ○ | 18 | ○ | ○ | ○ |
| Example 52 | 209 | ○ | 18 | ○ | ○ | ○ |
| Example 53 | 206 | Δ | 17 | Δ | ○ | ○ |
| Example 54 | 217 | ○ | 20 | ◎ | ○ | ○ |
| Example 55 | 213 | ○ | 23 | ◎ | ○ | ○ |
| Example 56 | 208 | Δ | 28 | ○ | ○ | ○ |
| Example 57 | 219 | ○ | 22 | ◎ | ○ | ○ |
| Example 58 | 213 | ○ | 21 | ◎ | ○ | ○ |
| Example 59 | 212 | Δ | 16 | ○ | ○ | ○ |
| Example 60 | 213 | ○ | 24 | ◎ | ○ | ○ |
| Example 61 | 213 | ○ | 13 | ○ | ○ | ○ |
| Example 62 | 210 | ○ | 19 | Δ | ○ | ○ |
| Example 63 | 202 | ○ | 13 | Δ | ○ | Δ |
| Example 64 | 211 | ○ | 14 | ○ | ○ | ○ |
| Example 65 | 221 | ○ | 18 | ○ | ○ | ○ |
| Example 66 | 231 | Δ | 23 | ◎ | Δ | ○ |
| Example 67 | 207 | Δ | 11 | ○ | ○ | ○ |
| Example 68 | 210 | ○ | 19 | ○ | ○ | ○ |
| Example 69 | 219 | ○ | 25 | ◎ | ○ | ○ |
| Example 70 | 223 | ○ | 32 | ◎ | Δ | ○ |
| Comp. Ex. 14 | 218 | X | 15 | Δ | ○ | X |
| Comp. Ex. 15 | 221 | X | 20 | Δ | ○ | X |
| Comp. Ex. 16 | 227 | Δ | 24 | ○ | ○ | Δ |
| Comp. Ex. 17 | 207 | Δ | 11 | Δ | ○ | Δ |
| Comp. Ex. 18 | 209 | Δ | 12 | ○ | ○ | ○ |
| Comp. Ex. 19 | 214 | ○ | 16 | ○ | ○ | ○ |
| Comp. Ex. 20 | 199 | ○ | 8 | X | ○ | X |
| Comp. Ex. 21 | 252 | X | 27 | ○ | X | Δ |
| Comp. Ex. 22 | 204 | X | 8 | Δ | ○ | X |
| Comp. Ex. 23 | 234 | ○ | 35 | ◎ | X | ○ |

Note 1: The amount (parts by weight) of the amide compound was based on 100 parts by weight of the ethylene series polymers which were the total of the ethylene series polymer (X) and the ethylene series high polymer (Y).
Note 2: In the item of the amide compound, each roman number has the following meaning:
(I): N,N'-distearyladipic acid amide
(II): ethylenebisstearic acid amide
(III): o-phenylenebisstearic acid amide

TABLE 5

| | Polymer | | | Dispersant | |
|---|---|---|---|---|---|
| | Ethylene Series Polymer (X) | Ethylene Series High Polymer (Y) | X/Y (weight ratio) | Modiper A3100 (*1) | Creiton G1652 (*2) |
| Example 71 | Polymer 8 | Polymer 19 | 50/50 | 2.0 | 0 |
| Example 72 | Polymer 8 | Polymer 19 | 50/50 | 2.0 | 0 |
| Example 73 | Polymer 8 | Polymer 19 | 50/50 | 2.0 | 0 |
| Example 74 | Polymer 8 | Polymer 19 | 50/50 | 0 | 2.0 |
| Example 75 | Polymer 8 | Polymer 19 | 50/50 | 0 | 2.0 |
| Example 76 | Polymer 8 | Polymer 19 | 50/50 | 0 | 2.0 |
| Example 77 | Polymer 8 | Polymer 19 | 50/50 | 2.0 | 0 |
| Example 78 | Polymer 8 | Polymer 19 | 50/50 | 2.0 | 0 |
| Example 79 | Polymer 8 | Polymer 19 | 50/50 | 2.0 | 0 |
| Example 80 | Polymer 8 | Polymer 19 | 50/50 | 0 | 2.0 |

TABLE 5-continued

| | | | | | |
|---|---|---|---|---|---|
| Example 81 | Polymer 8 | Polymer 19 | 50/50 | 0 | 2.0 |
| Example 82 | Polymer 8 | Polymer 19 | 50/50 | 0 | 2.0 |
| Example 83 | Polymer 8 | Polymer 19 | 50/50 | 15.0 | 0 |
| Example 84 | Polymer 8 | Polymer 19 | 50/50 | 15.0 | 0 |
| Example 85 | Polymer 8 | Polymer 19 | 50/50 | 15.0 | 0 |
| Example 86 | Polymer 8 | Polymer 19 | 50/50 | 0 | 15.0 |
| Example 87 | Polymer 8 | Polymer 19 | 50/50 | 0 | 15.0 |
| Example 88 | Polymer 8 | Polymer 19 | 50/50 | 0 | 15.0 |
| Example 89 | Polymer 8 | Polymer 19 | 50/50 | 15.0 | 0 |
| Example 90 | Polymer 8 | Polymer 19 | 50/50 | 15.0 | 0 |
| Example 91 | Polymer 8 | Polymer 19 | 50/50 | 15.0 | 0 |
| Example 92 | Polymer 8 | Polymer 19 | 50/50 | 0 | 15.0 |
| Example 93 | Polymer 8 | Polymer 19 | 50/50 | 0 | 15.0 |
| Example 94 | Polymer 8 | Polymer 19 | 50/50 | 0 | 15.0 |
| Example 95 | Polymer 1 | Polymer 19 | 50/50 | 0 | 2.0 |
| Example 96 | Polymer 2 | Polymer 19 | 50/50 | 0 | 2.0 |
| Example 97 | Polymer 3 | Polymer 19 | 50/50 | 0 | 2.0 |
| Example 98 | Polymer 4 | Polymer 19 | 50/50 | 0 | 2.0 |
| Example 99 | Polymer 5 | Polymer 19 | 50/50 | 0 | 2.0 |
| Example 100 | Polymer 6 | Polymer 19 | 50/50 | 0 | 2.0 |
| Example 101 | Polymer 7 | Polymer 19 | 50/50 | 0 | 2.0 |
| Example 102 | Polymer 9 | Polymer 19 | 50/50 | 0 | 2.0 |
| Example 103 | Polymer 8 | Polymer 19 | 15/85 | 2.0 | 0 |
| Example 104 | Polymer 8 | Polymer 19 | 30/70 | 2.0 | 0 |
| Example 105 | Polymer 8 | Polymer 19 | 70/30 | 2.0 | 0 |
| Example 106 | Polymer 8 | Polymer 19 | 85/15 | 2.0 | 0 |
| Comp. Ex. 24 | Polymer 8 | Polymer 19 | 50/50 | 0 | 0 |
| Comp. Ex. 25 | Polymer 10 | Polymer 19 | 50/50 | 2.0 | 0 |
| Comp. Ex. 26 | Polymer 11 | Polymer 19 | 50/50 | 2.0 | 0 |

| | Polyolefin Wax | | Domain Size in | 70% Fixing | Hot Offset |
|---|---|---|---|---|---|
| | Hiwax 420P | Biscol 550P | Binding Resin (μm) | Temp. (°C.) | Temp. (°C.) |
| Example 71 | 5 | 0 | 3.9 | 130 | 221 |
| Example 72 | 25 | 0 | 4.3 | 132 | 231 |
| Example 73 | 40 | 0 | 6.5 | 136 | 237 |
| Example 74 | 5 | 0 | 4.3 | 132 | 222 |
| Example 75 | 25 | 0 | 5.8 | 126 | 229 |
| Example 76 | 40 | 0 | 7.1 | 129 | 233 |
| Example 77 | 0 | 5 | 4.8 | 131 | 232 |
| Example 78 | 0 | 25 | 5.9 | 128 | 237 |
| Example 79 | 0 | 40 | 8.0 | 132 | 241 |
| Example 80 | 0 | 5 | 5.1 | 129 | 235 |
| Example 81 | 0 | 25 | 6.5 | 132 | 241 |
| Example 82 | 0 | 40 | 7.9 | 134 | 248 |
| Example 83 | 5 | 0 | 5.0 | 133 | 234 |
| Example 84 | 25 | 0 | 7.0 | 131 | 237 |
| Example 85 | 40 | 0 | 8.3 | 131 | 243 |
| Example 86 | 5 | 0 | 5.7 | 128 | 225 |
| Example 87 | 25 | 0 | 7.0 | 133 | 232 |
| Example 88 | 40 | 0 | 8.6 | 134 | 238 |
| Example 89 | 0 | 5 | 6.4 | 131 | 221 |
| Example 90 | 0 | 25 | 7.6 | 132 | 226 |
| Example 91 | 0 | 40 | 9.1 | 137 | 232 |
| Example 92 | 0 | 5 | 5.4 | 127 | 223 |
| Example 93 | 0 | 25 | 5.9 | 132 | 230 |
| Example 94 | 0 | 40 | 6.1 | 131 | 236 |
| Example 95 | 25 | 0 | 7.3 | 127 | 222 |
| Example 96 | 25 | 0 | 5.7 | 128 | 226 |
| Example 97 | 25 | 0 | 6.0 | 131 | 233 |
| Example 98 | 25 | 0 | 6.3 | 129 | 225 |
| Example 99 | 25 | 0 | 6.1 | 131 | 224 |
| Example 100 | 25 | 0 | 7.0 | 132 | 228 |
| Example 101 | 25 | 0 | 6.5 | 135 | 226 |
| Example 102 | 25 | 0 | 5.9 | 132 | 232 |
| Example 103 | 25 | 0 | 10.6 | 139 | 247 |
| Example 104 | 25 | 0 | 6.8 | 135 | 241 |
| Example 105 | 25 | 0 | 3.3 | 128 | 225 |
| Example 106 | 25 | 0 | 3.0 | 123 | 220 |
| Comp. Ex. 24 | 25 | 0 | 12.1 | 132 | 206 |
| Comp. Ex. 25 | 25 | 0 | 6.0 | 146 | 211 |
| Comp. Ex. 26 | 25 | 0 | 5.8 | 153 | 215 |

| | Toner Strength | Blocking | Contamination of Photosensi- | Charge | Image Quality |
|---|---|---|---|---|---|

TABLE 5-continued

| | (μm) | Properties | tive Member | Stability | (fogging) |
|---|---|---|---|---|---|
| Example 71 | 35 | ○ | ○ | ○ | ○ |
| Example 72 | 39 | ○ | ○ | ○ | ○ |
| Example 73 | 43 | ◎ | ○ | ○ | ○ |
| Example 74 | 34 | ◎ | ◎ | ○ | ○ |
| Example 75 | 38 | ◎ | ◎ | ○ | ○ |
| Example 76 | 42 | ◎ | ○ | ○ | ○ |
| Example 77 | 31 | ◎ | ◎ | ○ | ○ |
| Example 78 | 35 | ○ | ○ | ○ | ○ |
| Example 79 | 39 | ○ | ○ | ○ | ○ |
| Example 80 | 33 | ◎ | ◎ | ○ | ○ |
| Example 81 | 38 | ◎ | ○ | ○ | ○ |
| Example 82 | 40 | ◎ | ○ | ○ | ○ |
| Example 83 | 33 | ◎ | ◎ | ○ | ○ |
| Example 84 | 40 | ◎ | ◎ | ○ | ○ |
| Example 85 | 46 | ◎ | ◎ | ○ | ○ |
| Example 86 | 31 | ◎ | ◎ | ○ | ○ |
| Example 87 | 39 | ◎ | ◎ | ○ | ○ |
| Example 88 | 43 | ○ | ◎ | Δ | ○ |
| Example 89 | 37 | ○ | ○ | ○ | ○ |
| Example 90 | 43 | ○ | ◎ | ○ | ○ |
| Example 91 | 47 | ○ | ◎ | Δ | ○ |
| Example 92 | 35 | ◎ | ◎ | ○ | ○ |
| Example 93 | 41 | ◎ | ◎ | ○ | ○ |
| Example 94 | 47 | ◎ | ◎ | ○ | ○ |
| Example 95 | 37 | ◎ | ◎ | ○ | ○ |
| Example 96 | 36 | ◎ | ◎ | ○ | ○ |
| Example 97 | 35 | ○ | ○ | ○ | ○ |
| Example 98 | 38 | ○ | ◎ | ○ | ○ |
| Example 99 | 36 | ○ | ◎ | ○ | ○ |
| Example 100 | 35 | ◎ | ◎ | ○ | ○ |
| Example 101 | 34 | ◎ | ◎ | ○ | ○ |
| Example 102 | 36 | ○ | ○ | ○ | ○ |
| Example 103 | 48 | ◎ | ◎ | ○ | ○ |
| Example 104 | 45 | ◎ | ◎ | ○ | ○ |
| Example 105 | 32 | ○ | ◎ | ○ | ○ |
| Example 106 | 27 | ○ | ◎ | Δ | ○ |
| Comp. Ex. 24 | 16 | ○ | Δ | x | Δ |
| Comp. Ex. 25 | 24 | Δ | x | ○ | x |
| Comp. Ex. 26 | 22 | ○ | x | ○ | Δ |

Note 1:
Each amount (parts by weight) of the dispersant and the polyolefin wax was based on 100 parts by weight of the ethylene series polymers which were the total of the ethylene series polymer (X) and the ethylene series high polymer (Y).
Note 2:
Actual commercial products of the dispersants and the polyolefin waxes in the table were as follows:
Dispersants:
Modiper A3100 (trade name, made by Nippon Oils & Fats Co., Ltd., polystyrene-polypropylene series graft copolymer)
Creiton G1652 (trade name, made by Shell Chemicals Co., Ltd., polystyrene series block copolymer)
Polyolefin waxes:
Hiwax 420P (trade name, made by Mitsui Petro-chemical Industries, Ltd., low-molecular weight polyolefin wax)
Biscol 550P (trade name, made by Sanyo Chemical Industries, Ltd., low-molecular weight polyolefin wax)

The effect of the present invention is as follows: according to the method of the present invention, stable and good images can be obtained even by a low-heat quantity fixing duplicator, which cannot be attained by conventional techniques. That is, with regard to a toner using a resin composition of the present invention, a lower limit fixing temperature is low, a non-hot offset temperature range is wide, and image properties also are extremely good. Thus, it is fair to say that the resin composition of the present invention has an excellent performance as the composition for the electrophotographic toner.

What is claimed is:

1. A resin composition for an electrophotographic toner comprising an ethylene series high polymer (Y) which is a homopolymer or copolymer of at least one bifunctional ethylene series unsaturated monomer which is a monomer having and polymerizable through a single carbon to carbon double bond or is a copolymer thereof with at least one polyfunctional monomer which is a monomer having and polymerizable through at least two carbon to carbon double bonds, the carbon to carbon double bonds not being conjugated with each other, the weight average molecular weight $M_w$ of said polymer (Y) being at least 100,000 and the $M_w/M_n$ of said polymer (Y) being at least 3, where $M_n$ is the number average molecular weight, and an ethylene series polymer (X) prepared by polymerizing 100 parts of a bifunctional ethylene series unsaturated monomer as defined above in the presence of 0.01–10 parts by weight of a substance having three or more peroxide groups in the molecule and/or in the presence of a substance having one or more unsaturated functional groups which are carbon to carbon double bonds and one or more peroxide groups in the molecule, the $M_w/M_b$ (where $M_w$ is the weight-average molecular weight, and $M_b$ is the weight-average molecular weight between crosslinking points) of said polymer (X) being from 2 to 99, the $M_w$ of said polymer (X) being 50,000 or less, the ratio of said polymer (X) to said polymer (Y) being from 15:85 to 85:15 (by weight).

2. The resin composition for an electrophotographic toner according to claim 1 wherein the $M_w$ of said ethylene series high polymer (Y) is 200,000 or more.

3. The resin composition for an electrophotographic toner according to claim 2 wherein Mw and Mw/Mn of said ethylene series high polymer (Y) are 200,000 or more and 5.0 or more, respectively.

4. The resin composition for an electrophotographic toner according to claim 1 wherein said ethylene series high polymer (Y) is a polymer having a weight-average molecular weight of 100,000 or more and a Z average molecular weight of 850,000 or more which is prepared by using a compound having 3 or more peroxide groups in one molecule as an initiator in accordance with a solution polymerization method.

5. The resin composition according to claim 1, wherein said ethylene series polymer (X) is prepared by polmerizing 100 parts of styrene in the presence of 3 parts of 2-2-bis (4,4-di-t-butylperoxycyclohexyl) propane and said ethylene series high polymer (Y) comprises a copolymer of 72 parts of styrene and 28 parts of n-butylacrylate prepared in the presence of 0.1 parts of di-t-butyl-peroxide and 3 parts of divinyl benzene, wherein the ratio of said ethylene series polymer (X) to said ethylene series high polymer (Y) is 1:1 (by weight).

6. A resin composition for an electrophotographic toner as recited in claim 1 wherein high polymer (Y) is a homopolymer of an aromatic vinyl monomer or a copolymer of an aromatic vinyl monomer with an acrylate, a methacrylate, an unsaturated dicarboxylic acid and/or divinylbenzene.

7. A resin composition for an electrophotographic toner as recited in claim 6 wherein the aromatic vinyl monomer is styrene.

8. A resin composition for an electrophotographic toner in claim 1 herein the polymer(X) is a homopolymer of an aromatic vinyl monomer or a copolymer of an aromatic vinyl monomer with an acrylate, a methacrylate, or an unsaturated dicarboxylic acid and/or divinylbenzene.

9. A resin composition for an electrophotographic toner in claim 8 wherein polymer(X) is a polystyrene.

* * * * *